(12) United States Patent
Okayama et al.

(10) Patent No.: US 7,511,878 B2
(45) Date of Patent: Mar. 31, 2009

(54) WAVELENGTH CONVERSION ELEMENT WITH QUASI-PHASE MATCHING STRUCTURE

(75) Inventors: Hideaki Okayama, Tokyo (JP); Yutaka Okabe, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 11/905,358

(22) Filed: Sep. 28, 2007

(65) Prior Publication Data

US 2008/0080044 A1    Apr. 3, 2008

(30) Foreign Application Priority Data

Sep. 29, 2006   (JP) .............. 2006-266445

(51) Int. Cl.
G02F 2/02   (2006.01)
(52) U.S. Cl. .................. 359/326; 359/328; 372/21
(58) Field of Classification Search ......... 359/326–330; 372/21, 22
See application file for complete search history.

(56) References Cited

U.S. PATENT DOCUMENTS

2003/0026573 A1* 2/2003 Mizuuchi et al. ............ 385/129
2003/0231890 A1* 12/2003 Asobe et al. ................ 398/187
2007/0121685 A1* 5/2007 Maekawa ..................... 372/21

FOREIGN PATENT DOCUMENTS

| JP | 5-273623 | 10/1993 |
| JP | 2002-539467 | 11/2002 |
| JP | 2004-020870 | 1/2004 |

OTHER PUBLICATIONS

"Broadband quasi-phase-matching wavelength converter using an engineered χ(2) grating", T. Umeki, et al., Proceedings of 2006 Fall JSAP General Conference, 30p-ZX-12.

* cited by examiner

Primary Examiner—Hemang Sanghavi
(74) Attorney, Agent, or Firm—Rabin & Berdo, P.C.

(57) ABSTRACT

A wavelength conversion element with a Quasi-Phase Matching structure which can suppress the ripples of fluctuation pulse waveforms of a change efficiency in a frequency band of the waveform conversion, without controlling the positions and dimensions of the polarization regions at high precision. The wavelength conversion element of the present invention has a plurality of first and second polarization regions, formed so that dielectric polarizations are inverted from each other, and an optical wave guide which is formed so as to pass through the first and second polarization regions, in a nonlinear optical substrate. And an absolute value of the wavelength conversion efficiency is set by adjusting the positional coordinates of the first and second polarization regions in a light traveling direction.

8 Claims, 14 Drawing Sheets

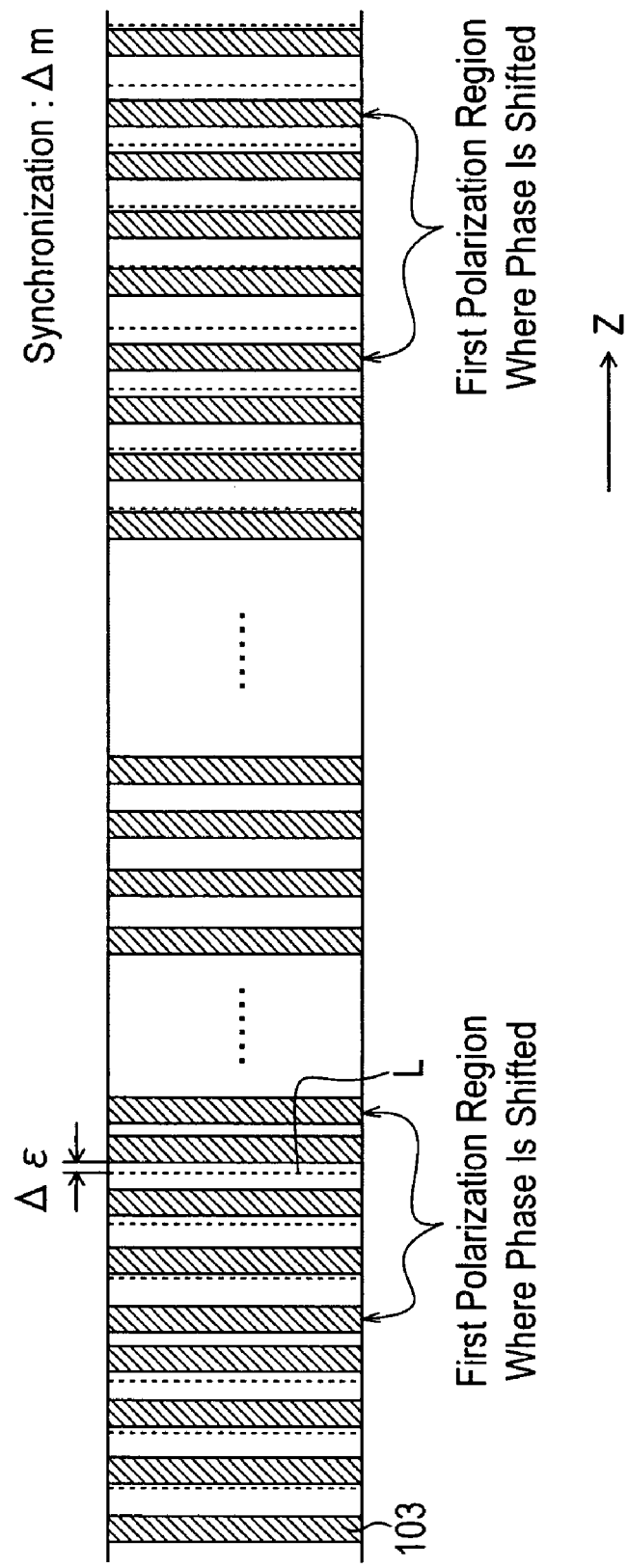

WAVELENGTH CONVERSION ELEMENT WITH QUASI-PHASE MATCHING STRUCTURE

BACKGROUND OF THE INVENTION

1. Field of the Invention

The present invention relates to a wavelength conversion element for converting a wavelength of a light into another wavelength using a nonlinear optical effect, and more particularly to an improvement of the QPM (Quasi-Phase Matching) structure of a wavelength conversion element.

2. Description of Related Art

Wavelength conversion elements for converting a light wavelength using an optical effect have been known. Such wavelength conversion elements are disclosed, for example, in Japanese Patent Application Laid-Open No. H5-273623 (U.S. Pat. No. 5,357,533) and Japanese Patent Application Laid-Open No. 2004-20870 (U.S. Pat. No. 6,806,986).

A wavelength conversion element is formed on a substrate having a nonlinear optical effect. For a substrate material, a z-plate of $LiNbO_3$ can be used. The $LiNbO_3$ substrate is a ferroelectric substance, and so it has dielectric polarization. Therefore on the $LiNbO_3$ substrate, regions of which dielectric polarization are inverted from each other (hereafter called "first and second polarization regions") can be formed alternately. An element structure, in which the first and second polarization regions are alternately formed, are called a QPM (Quasi-Phase Matching) structure. An optical wave guide is also formed on the substrate. A signal light and pump light multiplexed by an optical coupler are guided into the optical wave guide. An intermediate light is generated in the optical wave guide owing to the Second Harmonic Generation (SGH) of the signal light. A conversion light is also generated owing to the Difference Frequency Generation (DFG) of this intermediate light and pump light. For example, in the case when the wavelength of the signal light is 1550 nm and the wavelength of the pump light is 1540-1560 nm, the wavelength of the intermediate light is 775 nm. As a result, the wavelength of the conversion light becomes 1560-1540 nm according to the wavelength of the pump light.

The frequency band for which wavelength is converted by the wavelength conversion element changes according to conditions, such as a length of the wave guide. If the frequency band of the wavelength conversion is narrow, a high-speed pulse signal cannot be generated when the intermediate light is generated owing to SHG, and the wavelength conversion element cannot be used in a wide wavelength range. To solve these problems, a QPM structure, in which the cycles of the first and second polarization regions are gradually changed, has been known. This structure is called a "chirp structure".

However, a problem of the conventional chirp structure is that the fluctuation of the wavelength conversion efficiency with respect to frequency is large, and therefore ripples of the pulse waveforms cannot be suppressed sufficiently. In order to suppress the fluctuation of the wavelength conversion efficiency and distortion of the pulse waveform, for the first and second polarization regions must adopt a structure in which the nonlinear optical coefficient continuously changes at both ends of the element in addition to the above mentioned chirp structure. This structure has been implemented by controlling the widths of the first and second polarization regions. This technology was disclosed in "Proceedings of 2006 Fall JSAP General Conference, 30p-ZX-12".

However if the technology disclosed in this document is used, the dimensions of a very complicated structure must be controlled at high precision. If the dimensional accuracy is insufficient, the fluctuation of the wavelength conversion efficiency and the ripples of the pulse waveforms cannot be suppressed sufficiently. In order to implement a sufficient dimensional accuracy, the positions and dimensions of the polarization regions or electrodes for forming the polarization regions and the voltage application conditions must be controlled at high precision. But control of positions and dimensions of the electrodes have limitation because of the limit of the resolution of the electron beam writing device and the polarization region creation conditions.

SUMMARY OF THE INVENTION

It is an object of the present invention to provide a technology to suppress the ripples of the fluctuation pulse waveforms of the change efficiency in a frequency band of wavelength conversion, without controlling the position and dimensions of the polarization region at high precision.

The wavelength conversion element relate to the present invention is characterized in which a plurality of first polarization regions and a plurality of second polarization regions, of which dielectric polarizations are inverted from each other, are formed alternately in a nonlinear optical substrate; an optical wave guide which is formed so as to pass through said first and second polarization regions is formed in said nonlinear optical substrate, and; an absolute value of a wavelength conversion efficiency is set by adjusting positional coordinates of said first and second polarization regions in a light traveling direction.

BRIEF DESCRIPTION OF THE DRAWINGS

Other objects and advantages of the present invention will be described with reference to the accompanying drawings.

FIG. 5 is a conceptual diagram depicting an example of the QPM structure according to an embodiment of the present invention;

DESCRIPTION OF THE PREFERRED EMBODIMENTS

Embodiments of the present invention will now be described with reference to the drawings. The size, shape and positional relationships of each composing element are roughly shown to sufficiently assist in understanding the present invention, and the numeric conditions to be described below are merely examples.

Figure 1:
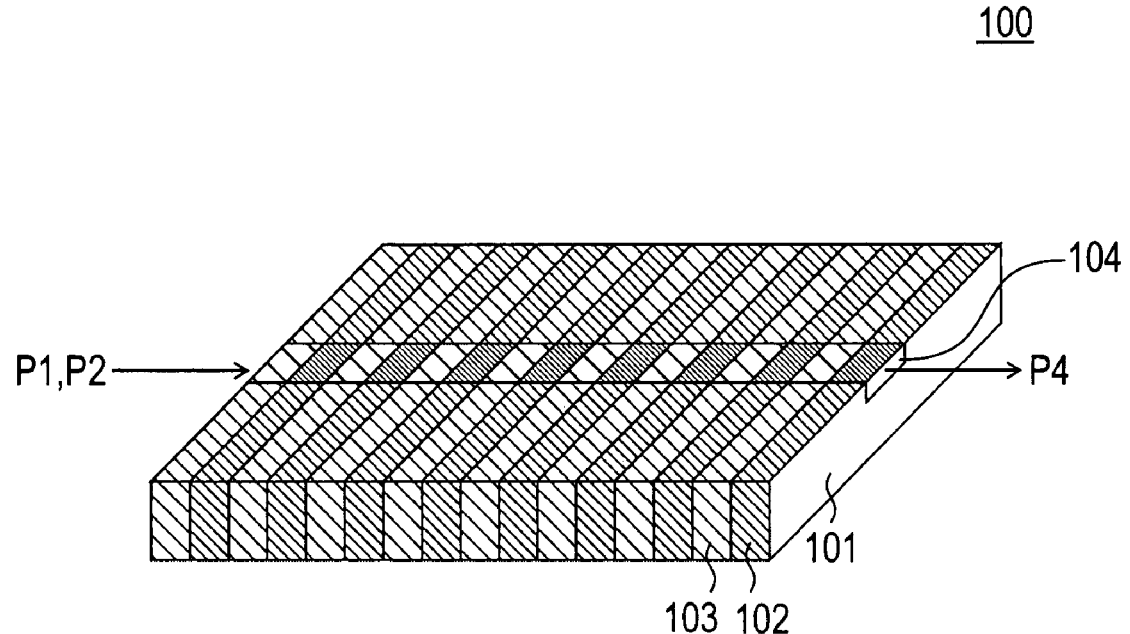
FIG. 1 is a conceptual diagram depicting the structure of the wavelength conversion element according to an embodiment of the present invention.

FIG. 1 is a conceptual diagram depicting the structure of the wavelength conversion element according to the present embodiment.

As FIG. 1 shows, a wavelength conversion element 100 of the present embodiment comprises a substrate 101, a plurality of first and second polarization regions 102 and 103, and an optical wave guide 104.

The substrate 101 is made of a substrate material having a nonlinear optical effect, such as the z-plate of $LiNbO_3$. The $LiNbO_3$ substrate 101 is a ferroelectric substance and has dielectric polarization.

The first and second polarization regions 102 and 103 are regions formed on the substrate 101, where the dielectric polarization is inverted from each other. As FIG. 1 shows, the first and second polarization regions 102 and 103 are alternately formed. In other words, the wavelength conversion element 100 has a QPM structure. Also the first and second polarization regions 102 and 103 are formed so that the length in the light traveling direction changes periodically, although this is not shown in FIG. 1. In other words, the wavelength conversion element 100 has a chirp structure. Also the first and second polarization regions 102 and 103 are structured so that the wavelength conversion efficiency increases in steps near the light entering face, and decreases in steps near the light emitting face.

The optical wave guide 104 is formed in a direction of passing through the first and second polarization regions 102 and 103 (e.g. a direction perpendicular to the first and second polarization regions 102 and 103).

Figure 2:
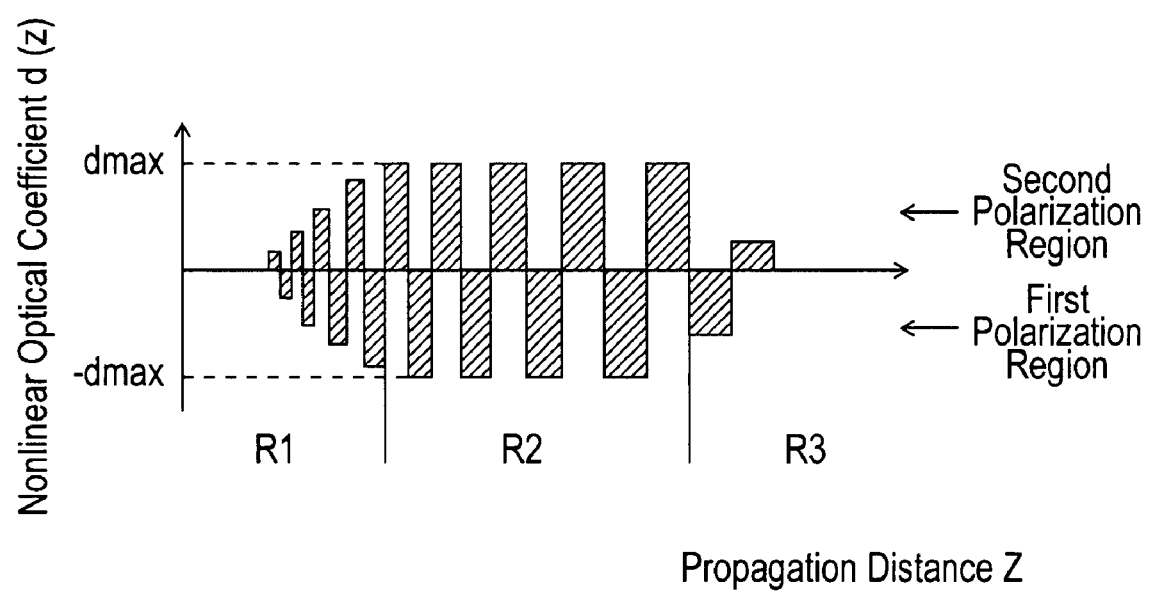
FIG. 2 is a conceptual diagram depicting an example of a relationship between the nonlinear optical coefficient and the propagation distance in the first and second polarization regions.

FIG. 2 is a conceptual diagram depicting the relationship between the nonlinear optical coefficient and the propagation distance in the first and second polarization regions 102 and 103. FIG. 2 is a comparison example to make it easier to understand the wavelength conversion element 100 according to the present embodiment. As described later, in the present embodiment, characteristics equivalent to FIG. 2 can be implemented by a structure different from the comparison example in FIG. 2.

In FIG. 2, the ordinate is a numeric value to indicate the nonlinear optical coefficient $d(z)$. Here a case of adjusting the wavelength conversion efficiency by the nonlinear optical coefficient $d(z)$ will be described as an example. The abscissa in FIG. 2 is a propagation distance of the light, and corresponds to the coordinate in the light propagation direction of the optical wave guide 104. In the example in FIG. 2, the region where the nonlinear optical coefficient $d(z)$ is negative corresponds to the first polarization region 102, and the region where the nonlinear optical coefficient $d(z)$ is positive corresponds to the second polarization region 103. As FIG. 2 shows, the first and second polarization regions 102 and 103 are structured so that the absolute value $|d(z)|$ of the nonlinear optical coefficient changes in steps. In other words, in the substrate 101, a section R1 where the absolute value $|d(z)|$ of the nonlinear optical coefficient increases in steps up to the maximum value dmax is created in the light entering face side, a section R2 where the absolute value $|d(z)|$ is constant at the maximum value dmax is created in the center position, and a section R3 where the absolute value $|d(z)|$ decreases in steps from the maximum value dmax is created in the light emitting face side.

In the QPM chirp structure where the first and second polarization regions are formed so that the absolute values $|d(z)|$ of the nonlinear optical coefficient are all the same, the wavelength conversion efficiency suddenly changes near the light entering face and near the light emitting face. Therefore on these faces, the frequency component of the nonlinear optical coefficient change functions as noise, and generates ripples in the frequency characteristics of the wavelength conversion element 100, and as a result, ripples are generated in the pulse waveform of the modulation light P4. In the case of the wavelength conversion element where the absolute value $|d(z)|$ of the nonlinear optical coefficient is uniform, the ratio of the noise component to the frequency characteristic is a little less than 50%.

In the example in FIG. 2, on the other hand, the absolute value $|d(z)|$ of the nonlinear optical coefficient is increased in steps near the light entering face and is decreased in steps near the light emitting face by changing the widths of the first and second polarization regions 102 and 103. By using this method, the change of the nonlinear optical coefficient $d(z)$ becomes mild near the light entering face and the light emitting face. Therefore the fluctuation of the change efficiency in the frequency band of the wavelength conversion and the ripples generated in the pulse waveform of the modulated light P4 are suppressed.

Figure 3:
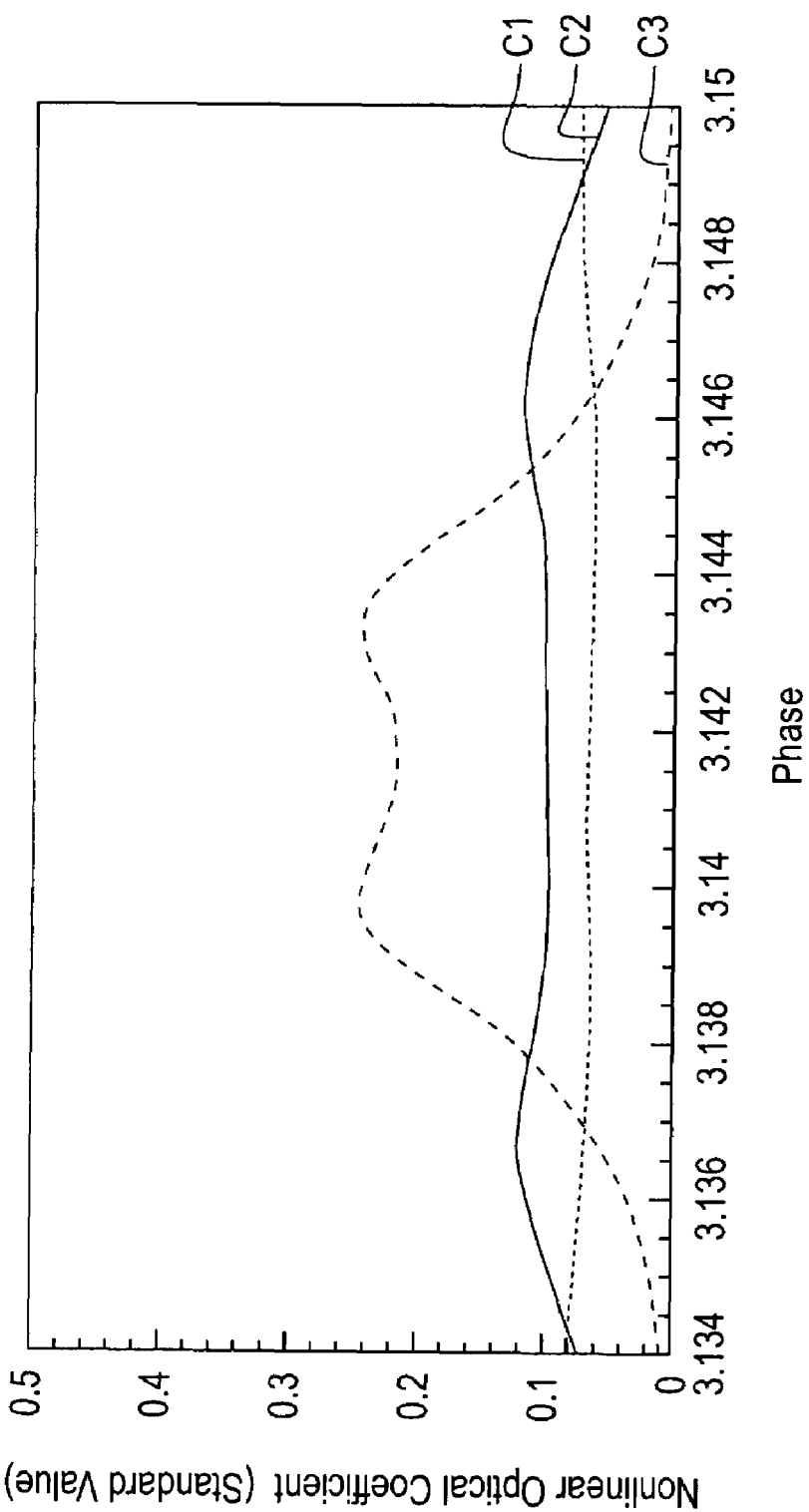
FIG. 3 is a graph for describing the frequency characteristics of the wavelength conversion element shown in FIG. 2.

FIG. 3 is a graph depicting the frequency characteristic of the wavelength conversion element shown in FIG. 2. In FIG. 3, the ordinate is a relative value which indicates the value of the nonlinear optical coefficient, and a value standardized with the peak value of a conventional wavelength conversion element, that is, a wavelength conversion element which uses a chirp structure and of which nonlinear optical coefficient is uniform, as "1". The abscissa in FIG. 3 shows the value of phase, which is given by $\pi \times \Delta k/K$. Here $\Delta k = k_{SHG} - 2 \times k_0$ ($k_{SHG}$ is a wave number of SHG, $k_0$ is a wave number of a signal wave). K is a wave number corresponding to the center cycle (average cycle) of the QPM chirp structure, and $K = 2\pi/\Lambda$ ($\Lambda$ is an average cycle of the QPM chirp structure).

Here graphs were created when the average cycle of the QPM chirp structure is 19 μm, for cases when the chirp quantity in a cycle is 0.153 (curve C1), 0.238 (curve C2) and 0.0765 (curve C3). The periodicity of the QPM chirp structure is 2000, the length of the portion where the edge of the change of the nonlinear optical coefficient is smooth is set to 40% of the entire length, and the shape of this portion is Gaussian. Under these conditions, the chirp quantity must be 1.7 times the conventional type in order to implement a wavelength conversion characteristic similar to the conventional QPM chirp structure based on a uniform nonlinear optical coefficient. Therefore the above mentioned chirp quantity corresponds to the case when the chirp quantity is 0.09 (=153/1.7), 0.14 (=0.238/1.7) and 0.045 (=0.0765/1.7) in the conventional QPM chirp structure. Here the material of the substrate 101 is $LiNbO_3$, and the wavelength of the signal light P1 is 1550 nm, and the wavelength intermediate light P3 is 775 nm.

Now an example of the QPM chirp structure according to the present embodiment will be described. According to the QPM structure of the present embodiment, the wavelength conversion efficiency is increased in steps near the light entering face and decreased in steps near the light emitting face, without changing the absolute value |d(z)| which is the wavelength conversion coefficient d(z). In the present embodiment, a structure substantially the same as the QPM structure described in FIG. 2 is implemented by shifting the positional coordinates of the first and second polarization regions 102 and 103 in the light traveling direction, as described later. Therefore in the present embodiment, it is unnecessary to control the width of the polarization inverted region, for which setting polarization inversion conditions is difficult. In other words, in the QPM chirp structure of the present embodiment, a section where the wavelength conversion efficiency increases in steps up to the maximum value (corresponds to the section R1 in FIG. 2) is created in the light entering face side of the substrate 101, a section where the wavelength conversion efficiency is constant at the maximum value (corresponds to the section R2 in FIG. 2) is created at the center portion thereof, and a section where the wavelength conversion efficiency decreases in steps from the maximum value (corresponds to the section R3 in FIG. 2) is created in the light emitting face side thereof.

If the nonlinear optical coefficient d(z) changes in steps (see FIG. 2), this nonlinear optical coefficient d(z) is given by the following Expression (1). Here F(z) is a function to indicate the change of the conversion coefficient intensity in the light traveling direction z. $\Delta\phi(z)$ is a phase term to indicate the chirp of the QPM cycle, and the uniform chirp is given by $\Delta\phi(z)=\Delta Kz^2$. K is a wave number which corresponds to the total length of the QPM chirp structure.

$$d(z)=F(z)\exp[jKz+\Delta\phi(z)] \quad (1)$$

If the absolute value of the nonlinear optical coefficient d(z) is constant, on the other hand, this nonlinear optical coefficient d(z) is given by the following Expression (2).

$$d(z)=\exp\{j[Kz+\Delta\phi(z)\pm\cos^{-1}(F(z))]\} \quad (2)$$

According to a comparison of Expression (1) and (2), Expression (2) is Expression (1) to which the phase term expressed by $\pm\cos^{-1}[F(z)]$ is added. Therefore if the term $j\cdot\sin\{\pm\cos^{-1}[F(z)]\}$, which includes this phase term, can be eliminated, Expression (2) becomes the same as Expression (1), and the wavelength conversion efficiency change of which edges are mild can be acquired even if the absolute value of the nonlinear optical coefficient d(z) is constant.

Here $j\cdot\sin\{\pm\cos^{-1}[F(z)]\}$, is an imaginary part. So this term can be eliminated without affecting the real part of Expression (2). In other words, if the positions (z coordinates) of the first and second polarization regions 102 and 103 are shifted so as to establish the following Expression (3), this term $j\cdot\sin\{\pm\cos^{-1}[F(z)]\}$ can be eliminated without changing the value of F(z).

$$j\sin(+\cos^{-1}[F(z)])+j\sin(-\cos^{-1}[F(z)])=0 \quad (3)$$

Here the sign of $\pm\cos^{-1}[F(z)]$ depends on the direction of shifting the first and second polarization regions 102 and 103.

Therefore if a corresponding pair of the first and second polarization regions 102 and 103 is selected, and these polarization regions 102 and 103 are shifted in the opposite directions, the unnecessary term $j\cdot\sin\{\pm\cos^{-1}[F(z)]\}$ can be eliminated.

The following Expression (4) shows the computing result of the shift quantity of the polarization regions 102 and 103, when the value of F (z) is fixed to +1 or −1. The following Expression (5) shows the computing result of the shift quantity of the polarization regions 102 and 103, when the value of F(z) is fixed to "0". In Expressions (4) and (5), $\Delta z=\cos^{-1}(F(z))/K$.

$$\left.\begin{array}{l} F(z) = -1, 1 \\ \cos^{-1}(F(z)) = \pm\pi, 0 \\ \Delta z = \pm\Lambda/2 \end{array}\right\} \quad (4)$$

$$\left.\begin{array}{l} F(z) = 0 \\ \cos^{-1}(F(z)) = \pm\pi/2 \\ \Delta z = \pm\Lambda/4 \end{array}\right\} \quad (5)$$

As Expressions (4) and (5) show, if F(z) is ±1, the polarization regions 102 and 103 are shifted by ±Λ/2 or by 0, and if F(z) is 0, the polarization regions 102 and 103 are shifted only by ±Λ/4.

Figure 4A:
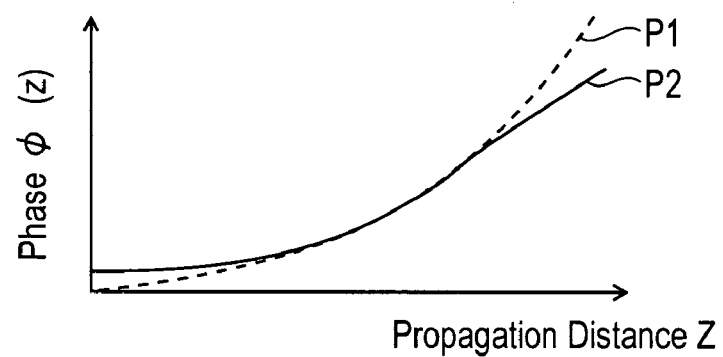
FIG. 4 are conceptual graphs depicting a principle of the wavelength conversion element according to an embodiment of the present invention.
Figure 4B:
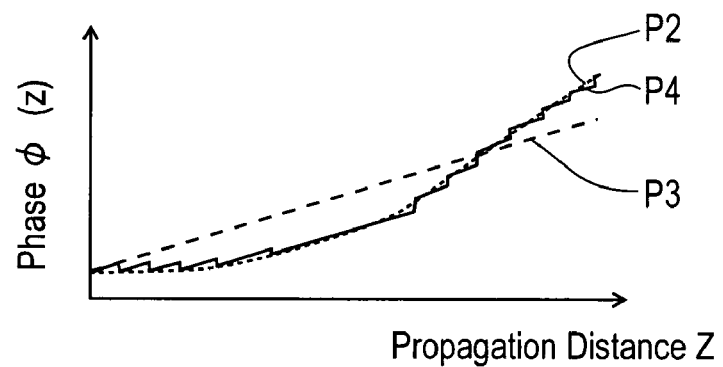

FIG. 4 are conceptual graphs for describing the principle of the wavelength conversion element 100 according to the present embodiment. In FIGS. 4(A) and 4(B), the ordinate is phase $\phi(z)$ and the abscissa is propagation distance z.

In FIG. 4(A), the curve P1 corresponds to the QPM chirp structure of which waveform conversion efficiency is uniform, and the phase $\phi(z)$ is given by $Kz+\Delta\phi(z)$. The curve P2 corresponds to the case when the wavelength conversion efficiency change of which edge is mild is implemented by the phase change of the conversion coefficient intensity F(z) (see Expression (2)), and the phase $\phi(z)$ is given by $Kz+\Delta\phi(z)+\cos^{-1}[F(z)]$.

In FIG. 4(B), the line P3 corresponds to the non-chirp QPM structure (QPM structure of which lengths of the polarization regions are uniform). In the QPM structure having the characteristic indicated by the line P3, the phase function indicated by P4 can be acquired by appropriately shifting the positions of the polarization regions. In this way, a QPM structure having a characteristic which approximately matches, the curve P2, can be acquired by appropriately shifting the polarization region positions. Hereafter the curve indicated by P4 is called the "approximate phase curve. The approximate phase curve P4 is comprised of many micro-sections, and the line segment of each micro-section has an inclination the same as P3. The step difference of each micro-section is given by $K\times\Delta z$. Here $\Delta z$ matches the resolution limit $\in$ of the electron writing device. In other words, in the step difference portion of the micro-section, the phase difference of the value corresponding to the resolution limit $\in$ is provided to the QPM structure.

In the conceptual diagram in FIG. 5, the dotted lines L indicate the QPM structure corresponding to the curve P2 in FIG. 4. The hatched regions indicate the second polarization region 103 in the QPM structure according to the present embodiment.

As FIG. 5 shows, the present embodiment structure is based on the non-chirp QPM structure with cycle Λm. In the present embodiment, each time the shift $\Delta\in$ from the QPM structure corresponding to the curve P2 reaches the resolution limit ∈, the positions of the polarization regions 102 and 103 are shifted by $\Delta z$ (see the approximate phase curve P4 in FIG. 4).

Figure 6:
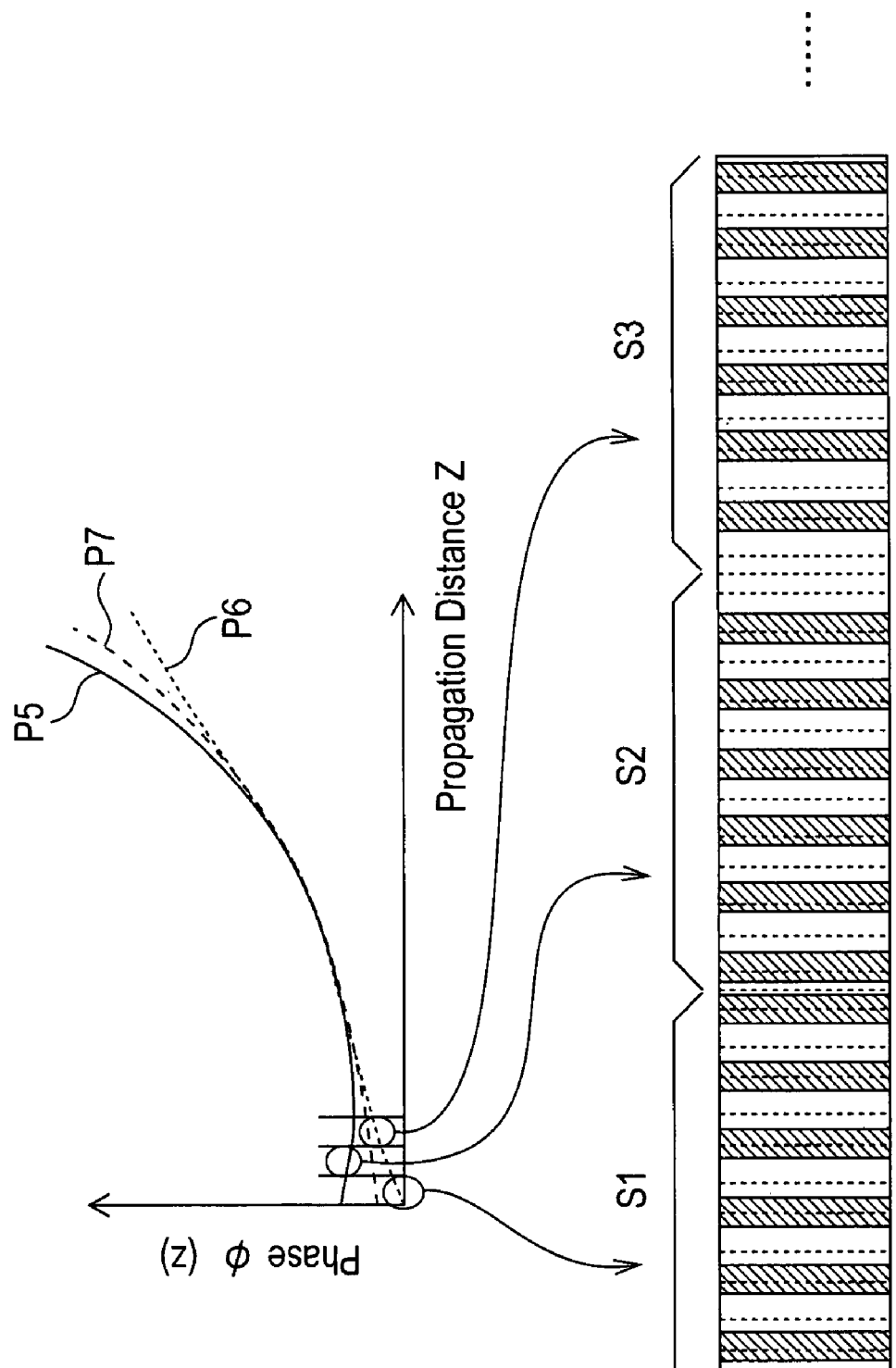
FIG. 6 is a conceptual diagram depicting the correspondence of the QPM structure according to the present embodiment and the wavelength conversion efficiency change.

FIG. 6 is a conceptual diagram depicting another example of the QPM structure according to the present embodiment. In FIG. 6, the curve P5 indicates the case when the phase $\phi(z)$ is given by $Kz+\Delta\phi(z)+\cos^{-1}(F(z))$, the curve P6 indicates the case when the phase $\phi(z)$ is given by $Kz+\Delta\phi(z)-\cos^{-1}(F(z))$, and the curve P7 indicates the case when the phase $\phi(z)$ is given by $Kz+\Delta\phi(z)$. As described above, the wavelength conversion efficiency change of which edge is mild cannot be implemented unless the term $j\cdot\sin\{\pm\cos^{-1}[F(z)]\}$ is eliminated. Therefore in the example of FIG. 6, the entire section of the substrate 101 is separated into a plurality of sections S1, S2, S3, . . . in a light traveling direction, and a section corresponding to the curve P5 and a section corresponding to the curve P6 are alternately created. In other words, in the example of FIG. 6, the phases of the polarization regions 102 and 103 are decided according to the curve P6 in the odd sections S1, S3, . . . , and are decided according to the curve P5 in even sections S2, . . . (or vise versa). By this, in the entire area of the substrate 101, the term $+j\sin[\cos^{-1}(F(z))]$ and $j\sin[-\cos^{-1}(F(z))]$ cancel each other, and the wavelength conversion efficiency change of which edge is mild can be implemented.

FIG. 7 are graphs depicting the frequency characteristic of the wavelength conversion element shown in FIG. 6. In FIG. 7, the ordinate and abscissa are the same as FIG. 3. The measurement conditions are also the same as the case of FIG. 3. FIG. 7 as well shows cases when the chirp quantity is 0.153 in a cycle (curve C4), 0.238 (curve C5) and 0.0765 (curve C6).

Figure 7A:
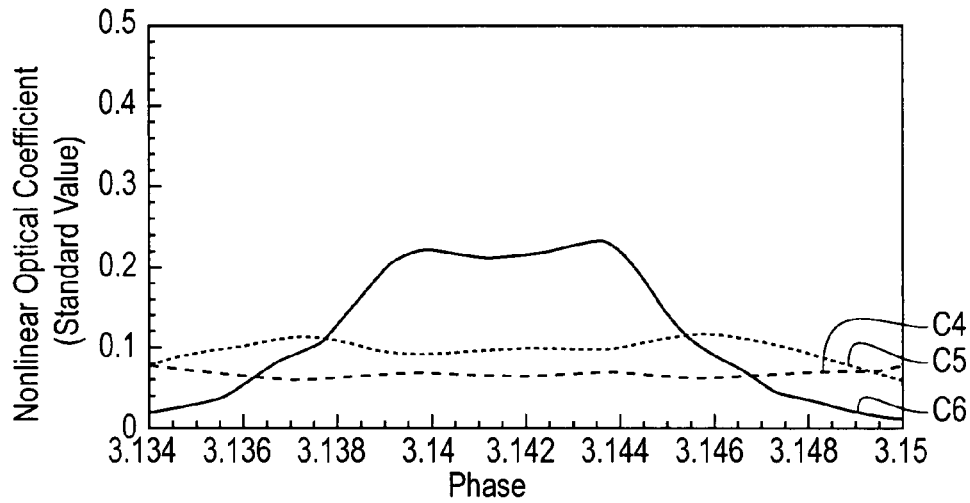
FIG. 7 are graphs depicting the characteristics of the wavelength conversion element shown in FIG. 6.

FIG. 7(A) is an example of the resolution limit ∈ of the electron writing device is 0.3 μm.

As the comparison of FIG. 7(A) and FIG. 3 shows, a frequency characteristic similar to the wavelength conversion element shown in FIG. 2 (that is, a wavelength conversion element where the wavelength conversion efficiency near the light entering face and light emitting face is changed in steps by adjusting the nonlinear optical coefficient d(z)) can also be implemented by the wavelength conversion element shown in FIG. 5 (that is, wavelength conversion element where the wavelength conversion efficiency near the light entering face and light emitting face is changed in steps by shifting the z coordinate phases of the first and second polarization regions 102 and 103). A slight difference is possible because of an error due to approximation.

Figure 7B:
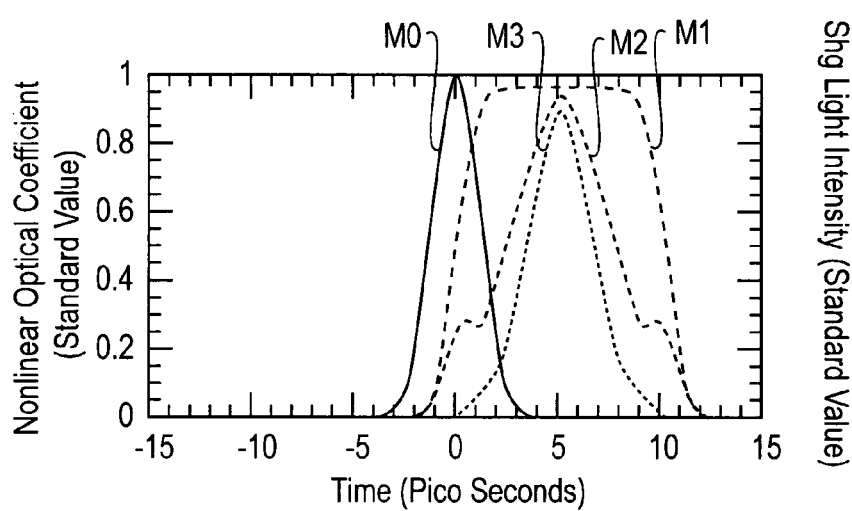
Figure 7C:
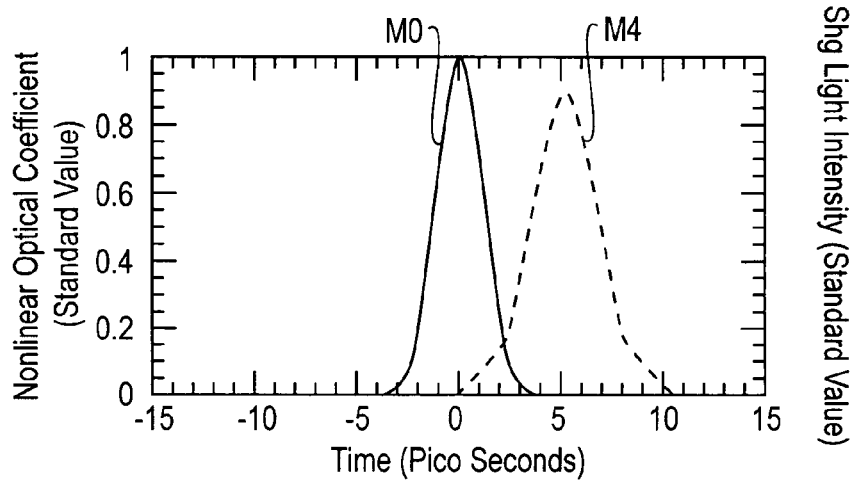

FIGS. 7(B) and (C) are graphs showing the result when the wavelength conversion characteristics of the wavelength conversion element having a structure shown in FIG. 5 are determined by computation. In FIGS. 7(B) and 7(C), the ordinate is a pulse light intensity (standard value) and the abscissa is time (pico seconds). M0 is a pulse waveform of a signal wave, M1 is an SHG pulse waveform of a non-chirp QPM structure, M2 is an SHG pulse waveform of a conventional chirp QPM structure (QPM structure of which wavelength conversion efficiency is uniform), M3 is an SHG pulse waveform of the wavelength conversion element of which nonlinear optical coefficient d(z) is adjusted (see FIG. 2), and M4 is an SHG pulse waveform of the waveform conversion element of the present embodiment (see FIG. 5).

As FIGS. 7(B) and 7(C) show, compared with the pulse M0 of the signal wave, the shape of the SHG pulse M1 of the non-chirp QPM structure is deformed into a trapezoidal shape. In the case of the SHG pulse M2 of the conventional chirp QPM structure, deformation of the shape at the peak is small, but the shape of the bottom portions is largely deformed. Whereas with the pulses M3 and M4 of the wavelength conversion elements corresponding to FIG. 2 and FIG. 5, there is very little deformation of the shape throughout the entire area of the pulse waveform.

Now an example of the manufacturing method of the wavelength conversion element according to the present embodiment will be described with reference to FIG. 8 to FIG. 14.

First the methods of fabricating the QPM structure will be described. As a method of fabricating a wavelength conversion element with a QPM structure, a liquid electrode method and a solid electrode method are used.

First a case of using the liquid electrode method will be described with reference to the cross-sectional process drawings in FIG. 8 and FIG. 9.

Figure 8A:
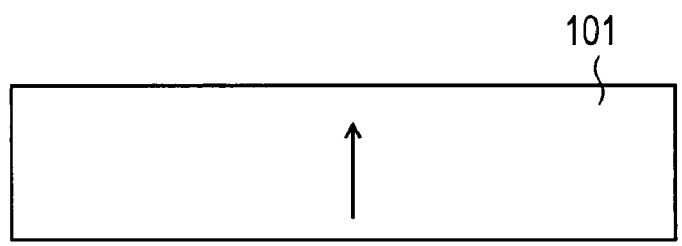
FIG. 8 are cross-sectional views depicting the steps for describing the manufacturing method of the wavelength conversion element according to an embodiment of the present invention.

Here the case of using a ferroelectric substrate 101 made of $LiNbO_3$ as the substrate 101 will be described (see FIG. 8(A)). As the arrow mark in FIG. 8(A) shows, in this substrate 101, spontaneous polarization in a direction to the surface has been formed. The thickness of the substrate 101 is 0.3-1 mm, for example.

Figure 8B:
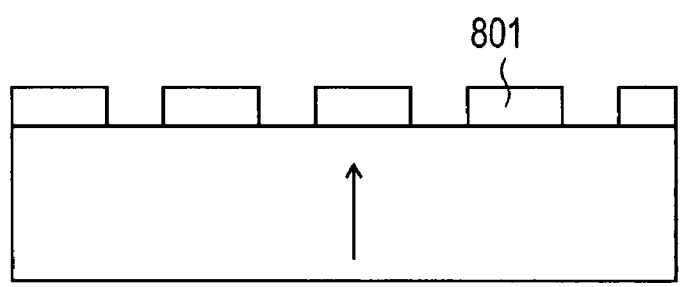
Figure 8C:
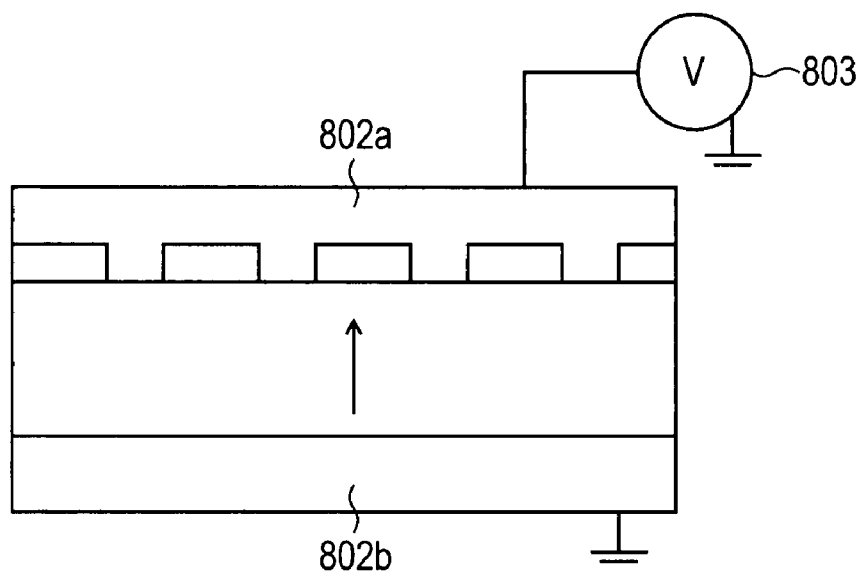

First a resist pattern 801 is formed on regions where the polarization regions 103 are formed out of the surface of the substrate 101 (see FIG. 8(B)). The width and space of the resist pattern 801 are 1-4 μm, for example. The positions to form the second polarization regions 103 are determined according to the positions where the resist pattern 801 is formed, and as a result, the positions to form the polarization regions 102 are also determined. The position of the resist pattern 801 is determined so that the z coordinate phases of the first and second polarization regions 102 and 103 are appropriately shifted (see FIG. 5 and FIG. 7).

Then on the front face and back face of the substrate 101, liquid electrode layers 802$a$ and 802$b$ are formed. And an electric field is generated by applying the pulse voltage using a pulse voltage generation source 803 (see FIG. 8(C)). The direction of the electric field to be generated is set to a direction in which the polarization of the substrate 101 can be inverted (a direction from the front face to back face of the substrate 101 in this case). The intensity of the electric field is determined according to the type of $LiNbO_3$ substrate 101. For example, about 20 kV/mm is preferable in the case of a congruent composition, and about 6 kV/mm is preferable in the case of a stoichiometric composition. The pulse width is several tens millisecond.

Figure 9A:
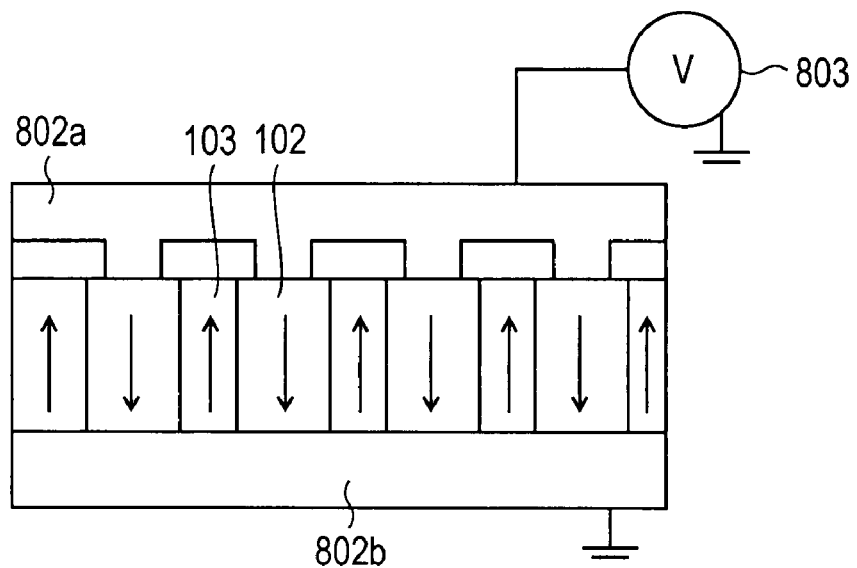
FIG. 9 are cross-sectional views depicting the steps for describing the manufacturing method of the wavelength conversion element according to an embodiment of the present invention.

By this, the polarization directions in portions which are not covered with the resist pattern 801 of the substrate 101 are inverted, and the first polarization regions 102 are formed (see FIG. 9(A)). The regions of which the polarization direction is not inverted in the substrate 101 become the second polarization regions 103.

Figure 9B:
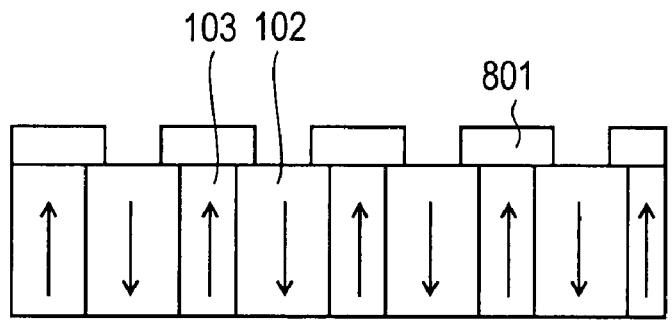
Figure 9C:
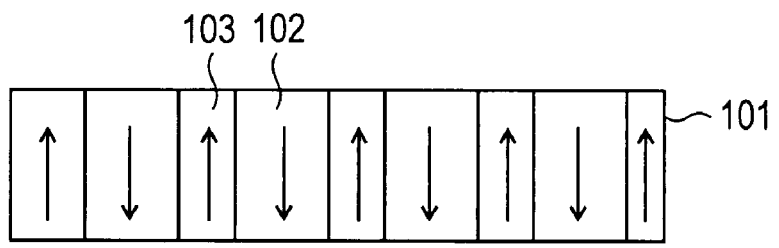

Then the liquid electrodes 802$a$ and 802$b$ are removed (see FIG. 9(B)), and the resist pattern 801 is also removed, and the QPM structure of the substrate 101 is completed (see FIG. 9(C)).

Now the case of using the solid electrode method will be described with reference to the cross-sectional process drawings in FIG. 10 and FIG. 11.

Figure 10A:
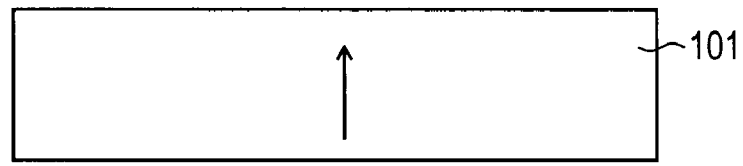
FIG. 10 are cross-sectional views depicting the steps for describing the manufacturing method of the wavelength conversion element according to an embodiment of the present invention.

Here as well the case of using the $LiNbO_3$ substrate 101, the same as the case of the liquid electrode method, will be described as an example (see FIG. 10(A)). In this example as well, spontaneous polarization has been formed in a direction toward the surface of the substrate 101, and the thickness of the substrate 101 is 0.3-1 mm, for example.

Figure 10B:
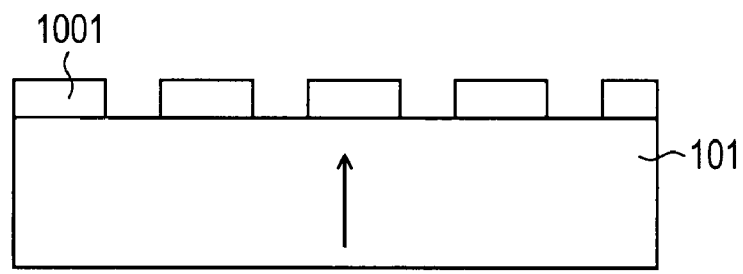

First using an ordinary photolithography method, a resist pattern 1001 is formed on regions where the second polarization regions 103 are formed, out of the surface of the substrate 101 (see FIG. 10(B)). The width and space of the resist pattern are 1-4 μm, for example.

Figure 10C:
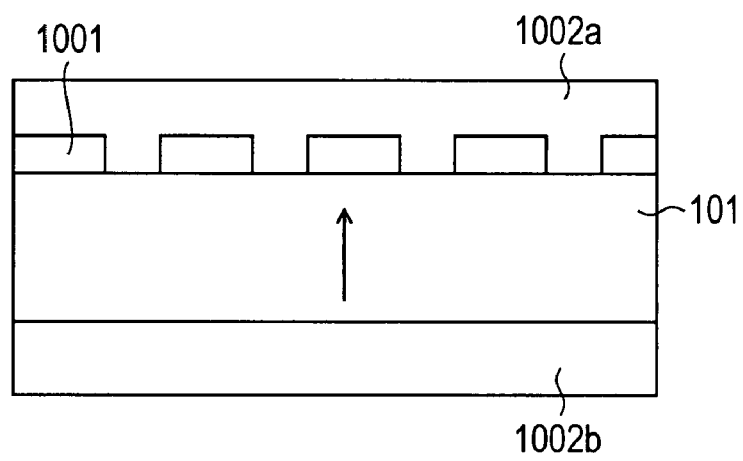

Then on the front face and back face of the substrate 101, conductive layers 1002a and 1002b, which are NiCr layers, for example, are formed (see FIG. 10(C)). And after etching back the conductive layer 1002a on the front face side, the resist pattern 1001 is removed, so as to form the solid electrode 1003 (see FIG. 11(A)).

Figure 11A:
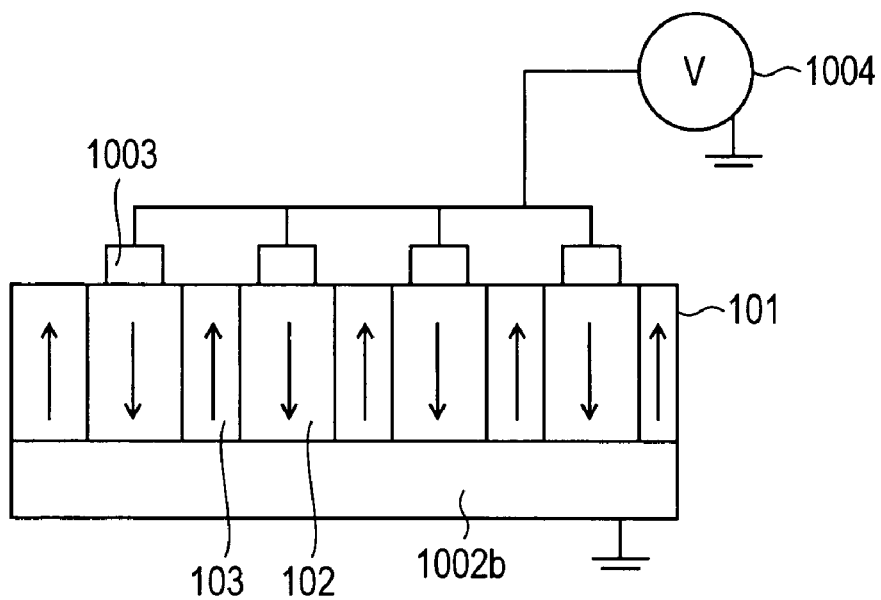
FIG. 11 are cross-sectional views depicting the steps for describing the manufacturing method of the wavelength conversion element according to an embodiment of the present invention.

And an electric field is generated by applying the pulse voltage using a pulse voltage generation source 1004 (see FIG. 11(A)). The direction, intensity and pulse width of the electric field to be generated are the same as the case of the above mentioned liquid electrode method.

By this, the polarization direction of the portions not covered by the resist pattern 1001, out of the substrate 101, is inverted, and the first polarization regions 102 are formed. The regions of which polarization direction was not inverted, out of the substrate 101, become the second polarization regions 103.

Figure 11B:
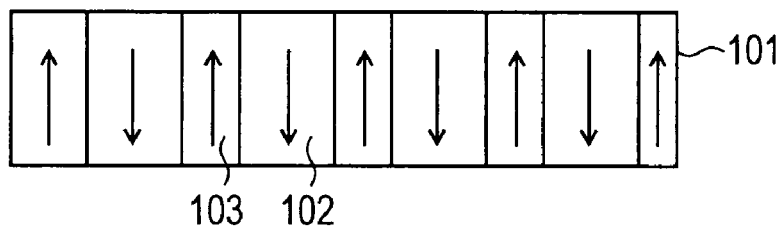

Then the solid electrode 1003 is removed, and the QPM structure of the substrate 101 is completed (see FIG. 11(B)).

Now a method of fabricating the optical wave guide 104 will be described. As a method of fabricating the optical wave guide 104, a proton exchange method and gluing method are used.

First a case of using the proton exchange method will be described with reference to the conceptual diagrams in FIG. 12 and FIG. 13.

Figure 12A:
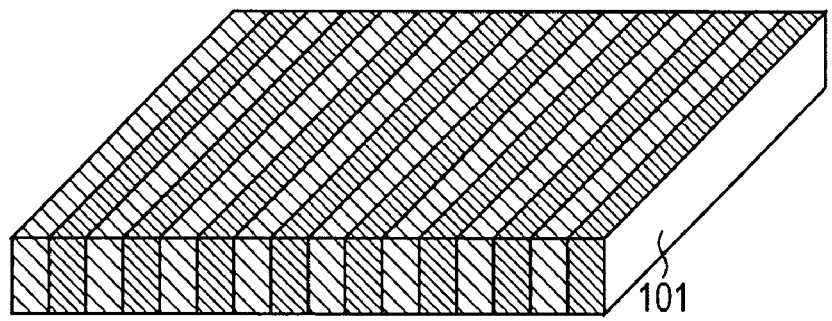
FIG. 12 are conceptual diagrams depicting the steps for describing the manufacturing method of the wavelength conversion element according to an embodiment of the present invention.

At first, the substrate 101 with a QPM structure is fabricated using the above mentioned liquid electrode method or solid electrode method (see FIG. 12(A)).

Figure 12B:
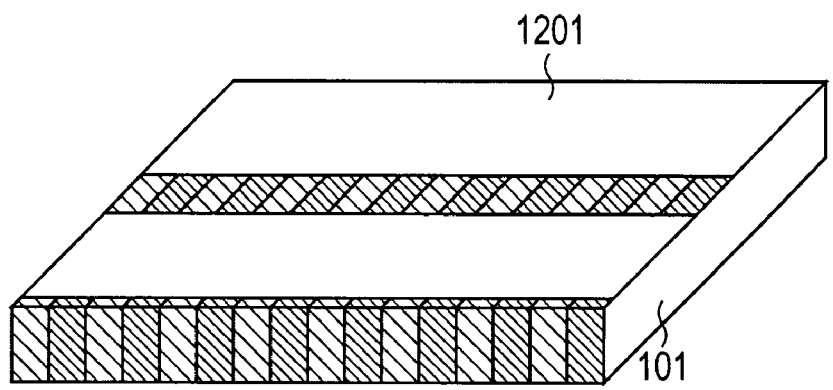

And a metal mask 1201 is formed in a portion where the optical wave guide 104 is not formed, out of the surface of the substrate 101, using an ordinary photolithography method (see FIG. 12(B)).

Figure 12C:
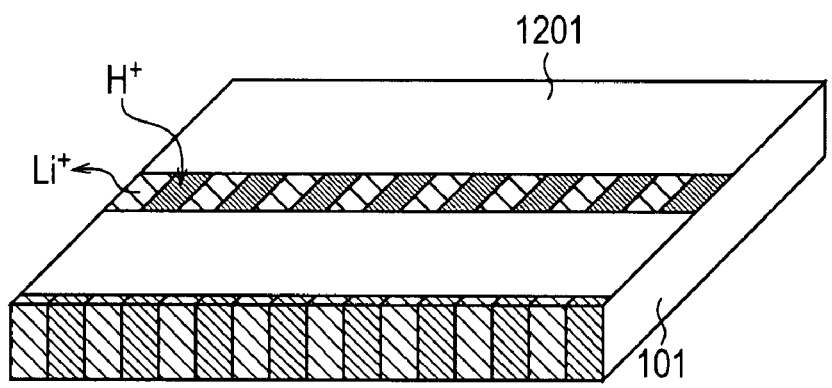

Then in benzoic acid, a lithium ion of the optical wave guide 104 is ion-exchanged with a proton (see FIG. 12(c)), The temperature of the benzoic acid at this time is 200°, for example, and the processing time is two hours, for example.

Figure 13A:
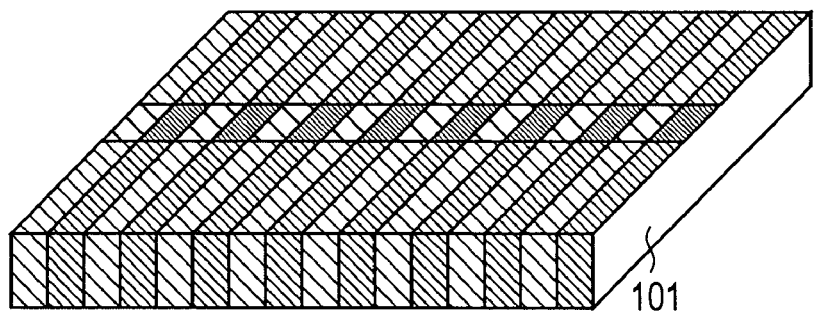
FIG. 13 are conceptual diagrams depicting the steps for describing the manufacturing method of the wavelength conversion element according to an embodiment of the present invention.

Then the metal mask 1201 is removed (see FIG. 13(A)).

Figure 13B:
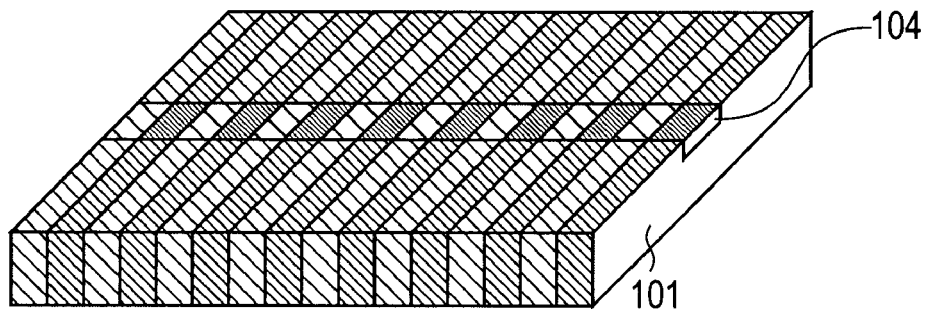

Then the substrate 101 is heated at 300° for two hours, so that the proton on the surface is diffused, and the wave guide 104 is completed (see FIG. 13(B)).

Now the case of using the gluing method will be described with reference to the conceptual diagrams in FIG. 14.

Figure 14A:
FIG. 14 are conceptual diagrams depicting the steps for describing the manufacturing method of the wavelength conversion element according to an embodiment of the present invention.

First the substrate 101 with a QPM structure is fabricated using the above mentioned liquid electrode method or solid electrode method (see FIG. 14(A)).

Figure 14B:
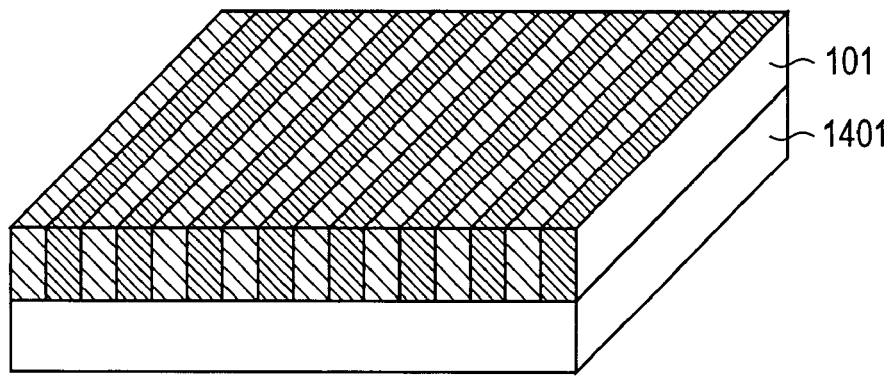

Then the base 1401 is glued to this substrate 101 (see FIG. 14(B)). For the base 1401, a $LiTaO_3$ substrate or Mg: $LiNbO_3$, for example, can be used.

Figure 14C:
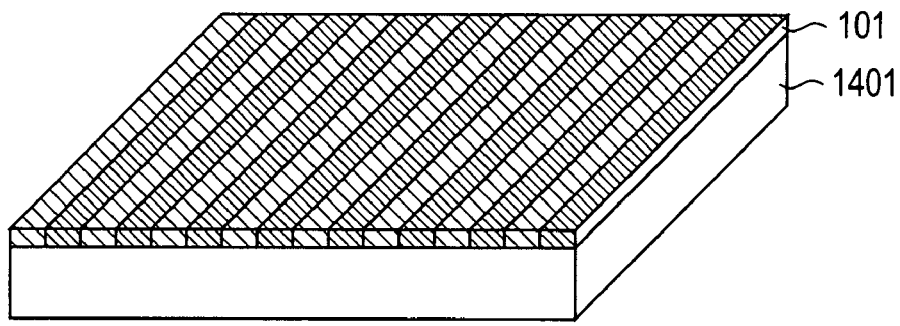
Figure 14D:
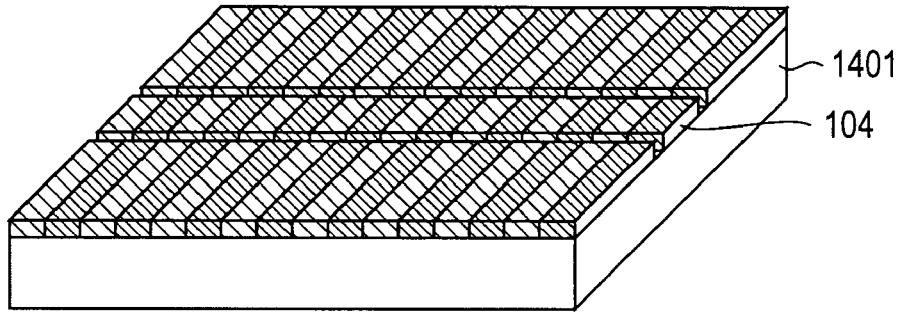

Then the substrate 101 is formed to be a thin film by polishing the surface (see FIG. 14(C)).

Finally trenches are formed in the substrate 101 using such a technology as dicing or dry etching, so that the region to be the optical wave guide 104 is physically isolated from the other regions. By this, the optical wave guide 104 completes (see FIG. 14(D)).

AS described above, according to the present embodiment, the first and second polarization regions 102 and 103 are created so that the absolute value |d(z)| of the nonlinear optical coefficient increases in steps near the light entering face and decreases in steps near the light emitting face, so the ripples of the pulse waveform can be suppressed without controlling the positions and dimensions of the polarization regions 102 and 103 at high precision.

Also the nonlinear optical coefficients d(z) of the polarization regions 102 and 103 are not adjusted, but the phases of the polarization regions 102 and 103 in the light traveling direction are shifted to create the above mentioned changes in steps, therefore the wavelength conversion element according to the present embodiment can be implemented in simple manufacturing steps.

What is claimed is:

1. A wavelength conversion element with a Quasi-Phase Matching structure, comprising:
   a nonlinear substrate,
   wherein a plurality of first polarization regions and a plurality of second polarization regions, of which dielectric polarizations are inverted from each other, are formed alternately in said nonlinear optical substrate,
   wherein an optical wave guide which passes through said first and second polarization regions is formed in said nonlinear optical substrate,
   wherein said first and second polarization regions have wavelength conversion coefficients with absolute values that are uniform, and
   wherein a wavelength conversion efficiency is set by adjusting positional coordinates of said first and second polarization regions in a light traveling direction.

2. The wavelength conversion element with a Quasi-Phase Matching structure according to claim 1, wherein said first and second polarization regions are formed so that a length thereof in the light propagation direction changes periodically.

3. The wavelength conversion element with a Quasi-Phase Matching structure according to claim 1, wherein said nonlinear optical substrate comprises:
   a first section, created at a light entering face side, where the wavelength conversion efficiency increases in steps up to a maximum value;
   a second section, created at a center portion, where the wavelength conversion efficiency is at the maximum value; and
   a third section, created at a light emitting side, where the wavelength conversion efficiency decreases in steps from the maximum value.

4. The wavelength conversion element with a Quasi-Phase Matching structure according to claim 1, wherein in said nonlinear optical substrate, a section where phases of said first and second polarization regions become $Kz+\Delta\phi+\cos^{-1}(F(z))$, and a section where the phases of said first and second polarization regions become $Kz+\Delta\phi-\cos^{-1}(F(z))$ (where F(z) is a function to indicate a change of the conversion coefficient intensity in the light traveling direction, $\Delta\phi(z)$ is a phase term to indicate a chirp in the QPM cycle, and K is a wave number corresponding to the total length of the QPM chirp structure according to the present embodiment) are alternately formed.

5. The wavelength conversion element with a Quasi-Phase Matching structure according to claim 1, wherein each time a shift from a desired wavelength conversion efficiency curve reaches a resolution limit of an electron writing device, positions of said first and second polarization regions shift by a predetermined distance.

6. The wavelength conversion element with a Quasi-Phase Matching structure according to claim 1, wherein said nonlinear optical substrate is separated into a plurality of micro-sections, and said positional coordinates are adjusted by shifting the phases among these micro-sections according to a desired wavelength conversion efficiency curve.

7. A wavelength conversion element with a Quasi-Phase Matching structure, comprising:
   a nonlinear optical substrate, wherein a plurality of first polarization regions and a plurality of second polarization regions, of which dielectric polarizations are inverted from each other, are formed alternately in said nonlinear optical substrate, wherein an optical wave guide which passes through said first and second polarization regions is formed in said nonlinear optical substrate, said optical wave guide extending from a light entry face side of said nonlinear optical substrate, wherein said nonlinear optical substrate has a first section adjacent said light entry face side thereof and a second section that follows said first section, wherein said first and second polarization regions have wavelength conversion coefficients $d(z)$ with absolute values that increase monotonically, in said first section, as the distance from said light entry face side increases, and wherein the absolute values of said wavelength conversion coefficients $d(z)$ of said first and second polarization regions in said second section are substantially equal and constant.

8. The wavelength conversion element with a Quasi-Phase Matching structure according to claim 7, wherein a wavelength conversion efficiency is set by adjusting positional coordinates of said first and second polarization regions in a light traveling direction.

* * * * *